United States Patent
Sogame et al.

(10) Patent No.: US 10,017,660 B2
(45) Date of Patent: *Jul. 10, 2018

(54) RESIN COMPOSITION, AND PREPREG AND LAMINATED SHEET USING THE SAME

(75) Inventors: Masanobu Sogame, Matsudo (JP);
Daisuke Ueyama, Kashiwa (JP);
Hajime Ohtsuka, Kamisu (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/701,034

(22) PCT Filed: May 31, 2011

(86) PCT No.: PCT/JP2011/062496
§ 371 (c)(1),
(2), (4) Date: Feb. 7, 2013

(87) PCT Pub. No.: WO2011/152402
PCT Pub. Date: Dec. 8, 2011

(65) Prior Publication Data
US 2013/0157061 A1  Jun. 20, 2013

(30) Foreign Application Priority Data
Jun. 2, 2010  (JP) .................. 2010-126927

(51) Int. Cl.
| | |
|---|---|
| *B32B 15/092* | (2006.01) |
| *C09D 163/00* | (2006.01) |
| *B32B 27/38* | (2006.01) |
| *C08G 59/40* | (2006.01) |
| *C08J 5/24* | (2006.01) |
| *C08K 3/22* | (2006.01) |
| *C08L 63/00* | (2006.01) |
| *C09D 165/00* | (2006.01) |
| *C08L 65/00* | (2006.01) |

(52) U.S. Cl.
CPC .......... *C09D 163/00* (2013.01); *B32B 15/092* (2013.01); *B32B 27/38* (2013.01); *C08G 59/4014* (2013.01); *C08G 59/4042* (2013.01); *C08J 5/24* (2013.01); *C08K 3/22* (2013.01); *C08L 63/00* (2013.01); *C09D 165/00* (2013.01); *C08G 2261/3424* (2013.01); *C08J 2363/00* (2013.01); *C08J 2365/00* (2013.01); *C08J 2379/04* (2013.01); *C08L 65/00* (2013.01); *Y10T 428/31529* (2015.04)

(58) Field of Classification Search
CPC .. C08L 63/00; C08L 65/00; C08K 3/22; C08J 5/24; C09D 163/00; C09D 165/00; Y10T 428/31529; Y10T 428/31699; C07C 261/02; C08G 73/0655; H05K 1/0346; H05K 3/386; B32B 15/092; B32B 27/38

USPC ......... 528/422, 322, 407; 560/359; 524/563; 525/423; 428/418; 523/445.457
See application file for complete search history.

(56) References Cited

U.S. PATENT DOCUMENTS

| | | | | |
|---|---|---|---|---|
| 2002/0162685 | A1* | 11/2002 | Gotro ................... | H05K 3/4626 174/258 |
| 2005/0042466 | A1* | 2/2005 | Ohno et al. ..................... | 428/457 |
| 2006/0084787 | A1* | 4/2006 | Sugano et al. ................ | 528/422 |
| 2006/0089070 | A1 | 4/2006 | Gaku et al. | |
| 2008/0187763 | A1 | 8/2008 | Kato et al. | |
| 2009/0203279 | A1* | 8/2009 | Mori et al. ..................... | 442/233 |
| 2010/0101843 | A1* | 4/2010 | Wakabayashi et al. ...................... | C08F 220/18 174/258 |
| 2010/0227170 | A1* | 9/2010 | Endo ....................... | C08L 63/00 428/413 |
| 2011/0083890 | A1* | 4/2011 | Tanaka et al. ................ | 174/258 |
| 2012/0009836 | A1 | 1/2012 | Ueno et al. | |

(Continued)

FOREIGN PATENT DOCUMENTS

| | | |
|---|---|---|
| CN | 1803916 | 7/2006 |
| CN | 101024715 | 8/2007 |
| CN | 101240111 | 8/2008 |

(Continued)

OTHER PUBLICATIONS

Machine translation of JP 2009024056A, retrieved Sep. 25, 2013.*

(Continued)

*Primary Examiner* — Callie Shosho
*Assistant Examiner* — Krupa Shukla
(74) *Attorney, Agent, or Firm* — Greenblum & Bernstein, P.L.C.

(57) ABSTRACT

There is provided a resin composition that exhibits excellent heat resistance, heat conductivity, and water absorption. The resin composition comprises a cyanate ester resin (A) represented by formula (I), an epoxy resin (B), and an inorganic filler (C), the content of the inorganic filler (C) being 301 to 700 parts by weight based on 100 parts by weight in total of the cyanate ester resin (A) and the epoxy resin (B)

(I)

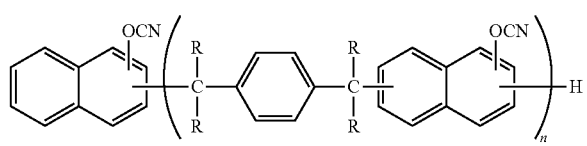

wherein Rs each independently represent a hydrogen atom or a methyl group; and n is an integer of 1 to 50.

4 Claims, No Drawings

(56) References Cited

U.S. PATENT DOCUMENTS

2014/0349089 A1* 11/2014 Ueyama et al. .............. 428/206

FOREIGN PATENT DOCUMENTS

| | | | |
|---|---|---|---|
| CN | 101343412 | | 1/2009 |
| CN | 101423668 | | 5/2009 |
| CN | 101580626 | A | 11/2009 |
| JP | 7-202364 | | 8/1995 |
| JP | 2004-27177 | | 1/2004 |
| JP | 2007-45984 | | 2/2007 |
| JP | 2007-138075 | | 6/2007 |
| JP | 2007-284596 | | 11/2007 |
| JP | 2008-50526 | | 3/2008 |
| JP | 2008-214602 | | 9/2008 |
| JP | 2009-24056 | | 2/2009 |
| JP | 2010-7040 | | 1/2010 |
| JP | 2010-31263 | | 2/2010 |
| WO | WO 2011015611 | A1 * | 2/2011 |

OTHER PUBLICATIONS

Potters-Ballotini-EMB10, retrieved Sep. 28, 2013.*
EPIC Summer Conference, Jun. 7-8, 2010, retrieved Sep. 24, 2013.*
Magnesium Oxide, "Threshold limits for Airborne Contaminants", Handbook of Chemistry and Physics, 2014-2015 (http://www.hbcpnetbase.com//articles/16_03_95.pdf#xml=http://www.hbcpnetbase.com/search/pdfHits.asp?id=16_03_95&DocId=118330&hitCount=1&hits=7223+).*
International Preliminary Report on Patentability Application No. PCT/JP2011/062496, dated Jan. 17, 2013.
U.S. Appl. No. 13/641,985 to Yoshinori Mabuchi et al., filed Oct. 18, 2012.
Search report from International Application No. PCT/JP2011/062496, dated Aug. 23, 2011.
European search report issued for application No. 11789805.6, dated Apr. 2, 2015.

* cited by examiner

RESIN COMPOSITION, AND PREPREG AND LAMINATED SHEET USING THE SAME

TECHNICAL FIELD

The present invention relates to a resin composition and more specifically relates to a resin composition for use in prepregs for printed wiring boards, a prepreg comprising the resin composition impregnated into or coated on a base material, and a laminated sheet comprising a cured product of the prepreg.

BACKGROUND OF THE INVENTION

In recent years, there is an ever-increasing tendency towards high-density integration, high function, and high-density assembly of semiconductors extensively used, for example, in electronic equipments, communication instruments, and personal computers. This has led to a demand for laminated sheets that possess excellent properties in terms of heat resistance and low water absorption and are used in metal foil-clad laminated sheets for printed wiring boards. Laminated sheets of FR-4 type in which the epoxy resin is cured with dicyandiamide have hitherto been extensively used as the laminated sheet for printed wiring boards. This type of laminated sheets could have not satisfactorily met the requirement for high heat resistance.

Cyanate ester resins are known as resins for printed wiring boards that possess excellent heat resistance. In recent years, for example, resin compositions obtained by mixing bisphenol A cyanate ester resins with other heat curable resins or thermoplastic resins have been extensively used as resin compositions for highly functional printed wiring boards, for example, for semiconductor plastic packages. The bisphenol A cyanate ester resins possess excellent properties in terms of electrical properties, mechanical properties, chemical resistance, and adhesion, but on the other hand, sometimes exhibit unsatisfactory water absorption and hygroscopic heat resistance under severe conditions. Accordingly, cyanate ester resins having other structures are under development with a view to further improving properties.

With the tendency towards high-density integration, high function, and high-density assembly of semiconductors, an importance has been placed on a high level of heat dissipation in printed wiring boards. For this reason, laminated sheets having high heat resistance, low water absorption, and high heat conductivity have been desired. Resin compositions having high heat resistance and low water absorption have been proposed as resin compositions for such laminated sheets (patent document 1). The resin compositions, however, had unsatisfactory heat conductivity.

Resin compositions containing inorganic fillers added for heat conductivity improvement purposes have also been proposed (patent document 2). The addition of inorganic fillers, however, has led to an enhancement in water absorption of the resin compositions, making it difficult to simultaneously meet high heat conductivity and low water absorption requirements.

PRIOR ART DOCUMENTS

Patent Documents

Patent document 1: Japanese Patent Application Laid-Open No. 45984/2007

Patent document 2: Japanese Patent Application Laid-Open No. 202364/1995

SUMMARY OF THE INVENTION

The present inventors have now found that resin compositions having excellent heat resistance, heat conductivity, and water absorption can be obtained by incorporating a specific amount of an inorganic filler in specific cyanate ester resin and epoxy resin. The present invention, has been made based on such finding.

Accordingly, an object of the present invention is to provide a resin composition having excellent heat resistance, heat conductivity, and water absorption.

Another object of the present invention is to provide a prepreg comprising the resin composition impregnated into or coated on a base material, and a laminated sheet comprising a cured product of the prepreg.

According to the present invention, there is provided a resin composition comprising:
a cyanate ester resin (A) represented by formula (I);
an epoxy resin (B); and
an inorganic filler (C),
the content of the inorganic filler (C) being 301 to 700 parts by weight based on 100 parts by weight in total of the cyanate ester resin (A) and the epoxy resin (B)

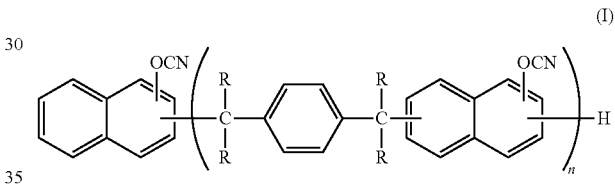

(I)

wherein Rs each independently represent a hydrogen atom or a methyl group; and n is an integer of 1 to 50.

By virtue of the presence of the cyanate ester resin represented by formula (I) in the resin composition according to the present invention, the molecular structure can reduce a factor for reaction inhibition, and, thus, the resin composition has excellent curability. Further, laminated sheets and metal foil-clad laminated sheets produced using the resin composition according to the present invention have excellent heat resistance, heat conductivity, and water absorption and thus are suitable as materials for printed wiring boards that can meet an enhanced density requirement and have very high industrial applicability.

DETAILED DESCRIPTION OF THE INVENTION

The resin composition according to the present invention comprises a cyanate ester resin (A) represented by formula (I), an epoxy resin (B), and an inorganic filler (C) as indispensable ingredients. Ingredients constituting the resin composition according to the present invention will be described.

<Cyanate Ester Resin (A)>

The cyanate ester resin (A) used in the present invention is a polymer or a prepolymer represented by formula (I). The cyanate ester resin (A) is obtained by reacting a naphthol compound such as α-naphthol or β-naphthol with a condensing agent such as p-xylene glycol, α,α'-dimethoxy-p-xylene, or 1,4-di(2-hydroxy-2-propyl)benzene to give a naphtholaralkyl resin and polycondensing the naphtholaralkyl resin with cyanic acid. The cyanate ester resin (A) may be produced by any publicly known process without particular limitation. For example, the cyanate ester resin (A) may be produced by reacting a naphtholaralkyl resin represented by formula (II) with a cyanogen halide in an inert organic solvent in the presence of a basic compound. Alternatively, the cyanate ester resin (A) may be produced by forming a salt from the naphtholaralkyl resin and the basic compound in a water-containing solution and then performing a two-phase interface reaction of this salt with a cyanogen halide.

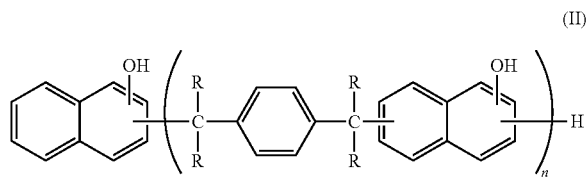

wherein Rs each independently represent a hydrogen atom or a methyl group; and n is an integer of 1 to 50.

In formula (I), the substituent Rs each independently represent a hydrogen atom or a methyl group. A cyanate ester resin represented by formula (I) wherein the substituents R represent hydrogen, that is, an α-naphtholaralkyl cyanate ester resin, is particularly suitable for use. In formula (I), n is an integer of 1 to 50. A proper mixture of a first cyanate ester resin (A) with one or at least two second cyanate ester resins (A) different from the first cyanate ester resin (A) in n may also be used.

The content of the cyanate ester resin (A) is preferably 10 to 90 parts by weight, more preferably 30 to 70 parts by weight, based on 100 parts by weight in total of the cyanate ester resin (A) and the epoxy resin (B) from the viewpoints of heat resistance, dissolution in solvent, and curability.

<Epoxy Resin (B)>

Any compound containing two or more epoxy groups per molecule may be used as the epoxy compound (B) in the present invention without particular limitation, and conventional epoxy resins may be used. Examples thereof include bisphenol A epoxy resins, bisphenol F epoxy resins, phenol novolak epoxy resins, cresol novolak epoxy resins, bisphenol A novolak epoxy resins, brominated bisphenol A epoxy resins, brominated phenol novolak epoxy resins, trifunctional phenol epoxy resins, tetrafunctional epoxy resins, naphthalene epoxy resins, biphenyl epoxy resins, phenolaralkyl epoxy resins, biphenylaralkyl epoxy resins, naphtholaralkyl epoxy resins, alicyclic epoxy resins, polyol epoxy resins, phosphorus-containing epoxy resins, compounds obtained by epoxidizing a double bond, for example, in glycidylamines, glycidyl esters, and butadiene, and compounds obtained by reacting hydroxyl-containing silicone resins with epichlorohydrin. Among them, bisphenol A epoxy resins, bisphenol F epoxy resins, phenol novolak epoxy resins, cresol novolak epoxy resins, bisphenol A novolak epoxy resins, brominated bisphenol A epoxy resins, brominated phenol novolak epoxy resins, biphenyl epoxy resins, phenolaralkyl epoxy resins, biphenylaralkyl epoxy resins, and naphtholaralkyl epoxy resins are suitable for use. These epoxy resins (B) may be used solely or in a proper combination of two or more of them. Further, the epoxy resins (B) may be in a monomer, oligomer, or resin form.

The content of the epoxy resin (B) is preferably 10 to 90 parts by weight, more preferably 30 to 70 parts by weight, based on 100 parts by weight in total of the cyante ester resin (A) and the epoxy resin (B) from the viewpoints of heat resistance, heat conductivity, and water absorption.

<Inorganic Filler (C)>

In the present invention, any inorganic filler commonly used in resin compositions for electric wiring boards may be used as the inorganic filler (C) without particular limitation. Examples thereof include silicas such as naturally occurring silica, fused silica, amorphous silica, and hollow silica, aluminum hydroxide, heat treated products of aluminum hydroxide (products obtained by heat treating aluminum hydroxide to remove a part of water of crystallization), metal hydrates such as boehmite and magnesium hydroxide, molybdenum compounds such as molybdenum oxide and zinc molybdate, zinc borate, zinc stannate, aluminum oxide, clay, kaolin, boron nitride, magnesium oxide, aluminum nitride, silicon nitride, and magnesium carbonate, talc, calcined clay, calcined kaolin, calcined talc, mica, short fibers of glass (fine powders of glass such as E glass or D glass), and hollow glass. Among them, for example, aluminum hydroxide, heat treated products of aluminum hydroxide (products obtained by heat treating aluminum hydroxide to remove a part of water of crystallization), metal hydrates such as boehmite and magnesium hydroxide, zinc borate, aluminum oxide, boron nitride, magnesium oxide, aluminum nitride, silicon nitride, and magnesium carbonate are suitable for use from the viewpoint of heat conductivity. These inorganic fillers may be used solely or in a proper combination of two or more of them.

Preferably, the inorganic filler (C) has an average particle diameter (D50) of 0.1 to 20 μm from the viewpoint of dispersibility. D50 means a median diameter which is a value that, when a measured particle size distribution of the powder is divided into two groups, the amount of particles on a coarser side is equal to the amount of particles on a finer side. The D50 value of the inorganic filler is generally measured by a wet laser diffraction-scattering method. In the present invention, two or more inorganic fillers different from each other in particle size distribution or average particle diameter may be used in combination.

The content of the inorganic filler (C) in the resin composition according to the present invention is 301 to 700 parts by weight based on 100 parts by weight in total of the cyanate ester resin (A) and the epoxy resin (B). The addition of the inorganic filler (C) in such a mixing amount to the cyanate ester resin (A) and the epoxy resin (B) is advantageous in that the heat conductivity can be dramatically improved and, at the same time, the flowability of the resin composition can be improved, contributing to a reduction in molding defects such as the occurrence of voids in molding of prepregs. The content of the inorganic filler (C) is more preferably 351 to 700 parts by weight.

The inorganic filler (C) may be added solely to the resin composition, or alternatively may be added in combination with silane coupling agents or wetting/dispersing agents. Any silane coupling agent commonly used in surface treatment of inorganic materials may be used as the silane coupling agent without particular limitation. Examples thereof include, but are not limited to, aminosilane coupling agents such as γ-aminopropyltriethoxysilane and N-β-(aminoethyl)-γ-aminopropyltrimethoxysilane, epoxysilane coupling agents such as γ-glycidoxypropyltrimethoxysilane, vinylsilane coupling agents such as γ-methacryloxypropyltrimethoxysilane, cationic silane coupling agents such as N-β-(N-vinylbenzylaminoethyl)-γ-aminopropyltrimethoxysilane hydrochloride, and phenylsilane coupling agents.

The coupling agents may be used solely or in a proper combination of two or more of them.

Any dispersion stabilizer commonly used for coating materials may be used as the wetting/dispersing agent without particular limitation. These dispersion stabilizers may be commercially available products, and examples of suitable commercially available dispersion stabilizers include Disperbyk-110, Disperbyk-111, Disperbyk-180, Disperbyk-161, BYK-W996, BYK-W9010, and BYK-W903 manufactured by BYK Japan K.K.

<Maleimide Compound (D)>

The resin composition according to the present invention may further comprise (D) a maleimide compound. Any compounds containing one or more maleimide groups per molecule may be used as the maleimide compound (D) without particular limitation. Example thereof include bis(4-maleimidophenyl)methane, 2,2-bis{4-(4-maleimidophenoxy)-phenyl}propane, bis(3,5-dimethyl-4-maleimidophenyl)methane, bis(3-ethyl-5-methyl-4-maleimidophenyl)methane, bis(3,5-diethyl-4-maleimidophenyl)methane, and tris(4-maleimidephenyl)methane. These maleimide compounds may be used solely or in a proper combination of two or more of them. The maleimide compounds may be in a monomer form, as well as in a prepolymer form or in the form of a prepolymer of the bismaleimide compound and an amine compound. Among them, bis(4-maleimidophenyl)methane, 2,2-bis{4-(4-maleimidophenoxy)-phenyl}propane, and bis(3-ethyl-5-methyl-4-maleimidophenyl)methane are preferred from the viewpoint of heat resistance.

The content of the maleimide compound (D) is preferably 5 to 75 parts by weight, more preferably 10 to 70 parts by weight, based on 100 parts by weight in total of the cyanate ester resin (A) and the maleimide compound (D) from the viewpoints of heat resistance and water absorption.

<Other Ingredients>

The resin composition according to the present invention may if necessary contain other ingredients in addition to the above ingredients. For example, curing accelerators may be contained from the viewpoint of properly regulating a curing speed. Any curing accelerators commonly used as curing accelerators for the cyanate ester resin (A) and the epoxy resin (B) may be used without particular limitation. Examples thereof include organometal salts of copper, zinc, cobalt, nickel and the like, imidazoles and derivatives thereof, and tertiary amines. The above curing accelerators may be used solely or in a proper combination of two or more of them. The addition amount of the curing accelerator can be properly regulated, for example, from the viewpoints of the degree of curing of the resins and the viscosity of the resin composition and is generally about 0.01 to 15 parts by weight based on 100 parts by weight in total of the resins.

The resin composition according to the present invention may further contain various polymer compounds such as other heat curable resins, thermoplastic resins, and oligomers and elastomers thereof, other flame retarding compounds, and additives in such an amount that does not sacrifice desired properties. They may be generally used without particular limitation as long as they are commonly used. Examples of flame retarding compounds include phosphorus compounds such as phosphoric acid esters and phosphoric acid melamine, nitrogen-containing compounds such as melamine and benzoguanamine, oxazine ring-containing compounds, and silicon compounds. Additives include, for example, ultraviolet absorbers, antioxidants, photopolymerization initiators, fluorescent brighteners, photosensitizers, dyes, pigments, thickeners, lubricants, antifoaming agents, dispersants, leveling agents, brighteners, and polymerization inhibitors. These additives may be used solely or in a proper combination of two or more of them according to need.

The resin composition according to the present invention may if necessary contain an organic solvent. The organic solvent is used to lower the viscosity of the resin composition, improve the handleability, and, at the same time, enhance impregnation of the resin composition into the glass cloth. Any organic solvent may be used without particular limitation as long as a mixture of the cyanate ester resin (A) and the epoxy resin (B) is compatible with the organic solvent. Examples thereof include, but are not limited to, ketones such as acetone, methyl ethyl ketone, methyl isobutyl ketone, and cyclohexanone, aromatic hydrocarbons such as benzene, toluene, and xylene, and amides such as dimethylformamide and dimethylacetamide. One of or a proper combination of two or more of these organic solvents may be used.

<Production Process of Resin Composition>

The resin composition according to the present invention may be obtained by mixing the cyanate ester resin (A), the epoxy resin (B), and the inorganic filler (C). The mixing may be carried out by any method without particular limitation. For example, the resin composition may be produced by dissolving the cyanate ester resin (A) and the epoxy resin (B) at respective predetermined concentrations in the organic solvent, adding the inorganic filler (C) in the solution, and stirring the mixture with a dissolver or a homomixer for 30 to 120 min.

<Prepreg and Laminated Sheet>

The prepreg according to the present invention comprises the resin composition impregnated into or coated on a base material. Publicly known base materials used in various materials for printed wiring boards may be used as the base material. Examples thereof include inorganic fibers such as E-glass, D-glass, S-glass, NE-glass, and quartz and organic fibers such as polyimide, polyamide, polyester, and poly-p-phenylenebenzobisoxazole fibers. These base materials may be properly selected depending upon contemplated applications and properties. The base materials may be used solely or in a proper combination of two or more of them according to need.

Any form of base materials that can be impregnated or coated with the resin composition may be used without particular limitation. Examples thereof include woven fabrics, nonwoven fabrics, rovings, chopped strand mats, and surfacing mats. The thickness of the base material is generally approximately 0.01 to 0.30 mm but is not limited to this thickness range.

The base material may have been surface-treated from the viewpoints of adhesion to resins and hygroscopic heat resistance. For example, the surface of the base material may be surface-treated with a silane coupling agent or the like. When a woven fabric is used as the base material, the woven fabric may have been physically opened.

In the present invention, base materials usable for thin product applications include polyimide, polyamide, and polyester films. The thickness of these films is not particularly limited but is preferably approximately 0.002 to 0.05 mm. Further, when films are used as the base material, preferably, the base material is previously surface-treated, for example, by plasma treatment from the viewpoint of adhesion to resins.

The prepreg according to the present invention may be produced by impregnating or coating the base material with the resin composition. For example, the prepreg is produced by impregnating or coating the base material with a resin varnish composed of the resin composition and an organic solvent and then heating the impregnated or coated base material in a drier of 100 to 200° C. for 1 to 60 min to semi-cure the resin. The content of the resin composition (containing an inorganic filler) relative to the base material is preferably in the range of 40 to 95% by weight based on the whole prepreg.

A laminated sheet may be formed by providing a single sheet of the prepreg or a stack of a plurality of sheets of the prepreg and performing molding (curing). Specifically, the laminated sheet may be produced by providing a single sheet of the prepreg or a stack of a plurality of sheets of the prepreg, placing and stacking a metal foil such as copper or aluminum on one surface or both surfaces of the single prepreg or the stack according to need, and subjecting the assembly to molding (curing). Any metal foil used in materials for printed wiring boards may be used as the metal foil without particular limitation. Techniques for conventional laminated sheets for printed wiring boards or multilayered boards may be adopted in the lamination molding. For example, the lamination molding is generally carried out under conditions of the use of a multistage press, a multistage vacuum press, a continuous molding machine, an autoclave molding machine, a vacuum laminator or the like, a temperature of 100 to 300° C., a pressure of 2 to 100 kgf/cm$^2$, and a heating time of 0.05 to 5 hr. Further, in the present invention, a multilayered board can be formed by lamination molding of a combination of the prepreg with a separately provided wiring board for an internal layer.

EXAMPLES

The present invention is further illustrated by the following Examples and Comparative Examples that are not intended as a limitation of the invention.

Synthesis of α-Naphtholaralkyl Cyanate Ester Resin

An α-naphtholaralkyl resin represented by formula (II) (SN495V, OH group equivalent: 236 g/eq., manufactured by Nippon Steel Chemical Co., Ltd.: containing compounds wherein n is 1 to 5) (0.47 mol, in terms of OH group) was dissolved in 500 ml of chloroform. Triethylamine (0.7 mol) was added to the solution. A solution of 0.93 mol of cyanogen chloride in chloroform (300 g) was added dropwise thereto at −10° C. for 1.5 hr. The mixture was stirred for 30 min, a mixed solution composed of 0.1 mol of triethylamine and 30 g of chloroform was added dropwise thereto, and the mixture was stirred for 30 min to complete the reaction. The resultant triethylamine hydrochloride was collected by filtration, and the filtrate was then washed with 500 ml of 0.1 N hydrochloric acid and was then washed four times with 500 ml of water, followed by drying over sodium sulfate. The dried product was subjected to evaporation at 75° C. and was further deaerated at 90° C. under the reduced pressure to give an α-naphtholaralkyl cyanate ester resin represented by formula (I) as a brown solid. The cyanate ester resin thus obtained was analyzed by an infrared absorption spectrum. As a result, an absorption attributable to a cyanate ester group was confirmed around 2264 cm$^{-1}$.

Example 1

The α-naphtholaralkyl cyanate ester resin (50 parts by weight), 50 parts by weight of a biphenylaralkyl epoxy resin (NC-3000FH, manufactured by Nippon Kayaku Co., Ltd.), 3 parts by weight of a silane coupling agent (Z6040, manufactured by Dow Corning Toray Co., Ltd.), and 5 parts by weight of a wetting/dispersing agent (BYK-W903, manufactured by BYK Japan K.K.) were mixed together. The mixture was dissolved in methyl ethyl ketone, and 490 parts by weight of aluminum oxide (DAW-03, manufactured by Denki Kagaku Kogyo K.K.) and 0.1 part by weight of manganese octylate were mixed into the solution to prepare a varnish. The varnish was diluted with methyl ethyl ketone, and a 0.05 mm-thick E-glass cloth was impregnated and coated with the diluted solution. The coated E-glass cloth was heat-dried at 160° C. for 7 min to obtain a prepreg having a resin content of 82% by weight.

Sheets (8 sheets) of the prepreg thus obtained were put on top of each other, and a 12 μm-thick electrolytic copper foil (3EC-III, manufactured by MITSUI MINING & SMELTING CO., LTD.) was placed on the top and the underside of the stack, followed by lamination molding under conditions of a pressure of 30 kgf/cm$^2$, a temperature of 220° C., and a molting time of 120 min to obtain a 0.8 mm-thick copper-clad laminated sheet.

Example 2

The α-naphtholaralkyl cyanate ester resin (40 parts by weight) used in Example 1, 20 parts by weight of bis(3-ethyl-5-methyl-4-maleimidephenyl)methane (BMI-70, manufactured by K.I. Chemical Industry Co., Ltd.), 40 parts by weight of a biphenylaralkyl epoxy resin (NC-3000FH), 5 parts by weight of a silane coupling agent (Z6040), and 3 parts by weight of a wetting/dispersing agent (BYK-W903) were mixed together and dissolved in methyl ethyl ketone. Aluminum oxide (DAW-03, manufactured by Denki Kagaku Kogyo K.K.) (400 parts by weight), 50 parts by weight of boron nitride (HP-4W, manufactured by MIZUSHIMA FERROALLOY CO., LTD.), 1 part by weight of 2,4,5-triphenylimidazole (manufactured by Tokyo Chemical Industry Co., Ltd.), and 0.05 part by weight of manganese octylate were mixed thereinto to obtain a varnish. The varnish thus obtained was diluted with methyl ethyl ketone, and a 0.05 mm-thick E-glass cloth was impregnated and coated with the diluted solution. The coated E-glass cloth was heat-dried at 160° C. for 8 min to obtain a prepreg having a resin content of 81% by weight. A 0.8 mm-thick copper-clad laminated sheet was then obtained in the same manner as in Example 1, except that the prepreg obtained just above was used.

Example 3

The α-naphtholaralkyl cyanate ester resin (35 parts by weight) used in Example 1, 5 parts by weight of a bismaleimidetriazine resin BT2670 (manufactured by Mitsubishi Gas Chemical Company, Inc.), 20 parts by weight of bis(3-ethyl-5-methyl-4-maleimidephenyl)methane, 40 parts by weight of biphenylaralkyl epoxy resin (NC-3000FH), 2 parts by weight of a silane coupling agent (Z6040), and 5 parts by weight of a wetting/dispersing agent (BYK-W903) were mixed together. The mixture was dissolved in methyl ethyl ketone. Boehmite (BN100, manufactured by KAWAI LIME INDUSTRY Co., Ltd.) (310 parts by weight), 1 part by weight of 2,4,5-triphenylimidazole (manufactured by Tokyo Chemical Industry Co., Ltd.), and 0.05 part by weight of manganese octylate were mixed thereinto to prepare a varnish. The varnish thus obtained was diluted with methyl ethyl ketone, and a 0.05 mm-thick E-glass cloth was impregnated and coated with the diluted solution. The coated E-glass cloth was heat-dried at 160° C. for 7 min to obtain a prepreg having a resin content of 79% by weight. A 0.8 mm-thick copper-clad laminated sheet was then obtained in the same manner as in Example 1, except that the prepreg obtained just above was used.

Example 4

The α-naphtholaralkyl cyanate ester resin (60 parts by weight) used in Example 1, 20 parts by weight of a phenol novolak epoxy resin (N770, manufactured by DIC), 20 parts by weight of a naphtholaralkyl epoxy resin (ESN-475V, manufactured by Nippon Steel Chemical Co., Ltd.), and 3 parts by weight of a wetting/dispersing agent (BYK-W903) were mixed together. The mixture was dissolved in methyl ethyl ketone. Magnesium oxide (PSF-WZ, manufactured by Konoshima Chemical Co., Ltd.) (330 parts by weight) and 0.1 part by weight of manganese octylate were mixed thereinto to prepare a varnish. The varnish thus obtained was diluted with methyl ethyl ketone, and a 0.05 mm-thick E-glass cloth was impregnated and coated with the diluted solution. The coated E-glass cloth was heat-dried at 160° C. for 8 min to obtain a prepreg having a resin content of 80% by weight. A 0.8 mm-thick copper-clad laminated sheet was then obtained in the same manner as in Example 1, except that the prepreg obtained just above was used.

Example 5

The α-naphtholaralkyl cyanate ester resin (25 parts by weight) used in Example 1, 25 parts by weight of bis(3-ethyl-5-methyl-4-maleimidephenyl)methane, and 50 parts by weight of naphtholaralkyl epoxy resin (ESN-475V) were mixed together. The mixture was dissolved in methyl ethyl ketone. Aluminum oxide (AA-3, manufactured by Sumitomo Chemical Co., Ltd.) (460 parts by weight), one part of 2,4,5-triphenylimidazole (manufactured by Tokyo Chemical Industry Co., Ltd.), and 0.05 part by weight of manganese octylate were mixed thereinto to prepare a varnish. The varnish thus obtained was diluted with methyl ethyl ketone. A 0.05 mm-thick E-glass cloth was impregnated and coated with the diluted solution. The coated E-glass cloth was heat-dried at 160° C. for 7 min to obtain a prepreg having a resin content of 82% by weight. A 0.8 mm-thick copper-clad laminated sheet was then obtained in the same manner as in Example 1, except that the prepreg obtained just above was used.

Comparative Example 1

A varnish was prepared in the same manner as in Example 3, except that a prepolymer of 2,2-bis(4-cyanatephenyl)propane (BT2070, manufactured by Mitsubishi Gas Chemical Company, Inc.) was used instead of the naphtholaralkyl cyanate ester resin. A 0.8 mm-thick copper-clad laminated sheet was then obtained in the same manner as in Example 3, except that the varnish prepared just above was used.

Comparative Example 2

A varnish was prepared in the same manner as in Example 1, except that the addition amount of aluminum oxide (DAW03) was changed from 490 parts by weight to 200 parts by weight. A prepreg having a resin content of 79% by weight was obtained in the same manner as in Example 1, except that this varnish was used. A 0.8 mm-thick copper-clad laminated sheet was then obtained in the same manner as in Example 1, except that the prepreg prepared just above was used.

Comparative Example 3

A varnish was prepared in the same manner as in Example 4, except that silica (FB-3SDC, manufactured by Denki Kagaku Kogyo K.K.) was used instead of magnesium oxide (PSF-WZ). A 0.8 mm-thick copper-clad laminated sheet was then obtained in the same manner as in Example 4, except that the varnish prepared just above was used.

Comparative Example 4

A varnish was prepared in the same manner as in Example 4, except that calcined talc (BST-200L, manufactured by Nippon Talc Co., Ltd.) was used instead of magnesium oxide (PSF-WZ). A 0.8 mm-thick copper-clad laminated sheet was then obtained in the same manner as in Example 4, except that the varnish prepared just above was used.

Comparative Example 5

A varnish was prepared in the same manner as in Example 2, except that the use of 400 parts by weight of aluminum oxide (DAW-03) and 50 parts by weight of boron nitride (HP-4W) were changed to the use of 750 parts by weight of aluminum oxide (DAW-03). A 0.8 mm-thick copper-clad laminated sheet was then obtained in the same manner as in Example 2, except that the varnish prepared just above was used.

Evaluation of Laminated Sheets

For the laminated sheets thus obtained, the heat conductivity, the glass transition temperature, and the water absorption were evaluated as follows. For the laminated sheet of Comparative Example 5, none of the heat conductivity, the glass transition temperature, and the water absorption could be evaluated due to the occurrence of voids.

1) Heat conductivity: Heat conductivity in a plane direction was calculated with a Xenon flash analyzer.

2) Glass transition temperature: Glass transition temperature was measured by a DMA method according to JIS C6481.

3) Water absorption: Water absorption after treatment under conditions of 121° C., 2 atm, and 5 hr with a pressure cooker tester (model PC-3, manufactured by Hirayama Manufacturing Corporation) according to JIS C6481.

The results of evaluation were as shown in Table 1 below.

TABLE 1

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Heat conductivity (W/m · K) | 1.7 | 3.3 | 1.4 | 2.4 | 1.9 | 1.4 | 0.8 | 0.7 | 0.9 | — |

TABLE 1-continued

| | Example | | | | | Comparative Example | | | | |
|---|---|---|---|---|---|---|---|---|---|---|
| | 1 | 2 | 3 | 4 | 5 | 1 | 2 | 3 | 4 | 5 |
| Glass transition temp. (° C.) | 241 | 263 | 252 | 254 | 261 | 253 | 240 | 244 | 241 | — |
| Water absorption (wt %) | 0.3 | 0.3 | 0.3 | 0.3 | 0.3 | 0.6 | 0.3 | 0.4 | 1.1 | — |

As is also apparent from Table 1, the copper-clad laminated sheets of Examples 1 to 5 were excellent in all of heat conductivity, heat resistance, and water absorption. By contrast, the copper-clad laminated sheet of Comparative Example 1 where a prepolymer of 2,2-bis(4-cyanatephenyl) propane was used as the cyanate ester resin had poor water absorption. Further, the copper-clad laminated sheets of Comparative Examples 3 and 4 where silica and silicic acid compounds such as calcined talc were contained as the inorganic filler had poor heat conductivity and unsatisfactory water absorption. The copper-clad laminated sheet of Comparative Example 2 where the amount of the inorganic filler incorporated was small had unsatisfactory heat conductivity. On the other hand, the copper-clad laminated sheet of Comparative Example 5 where the amount of the inorganic filler incorporated was large suffered from the occurrence of voids that made it impossible to use the copper-clad laminated sheet in practical use.

The invention claimed is:

1. A resin composition comprising:
   a cyanate ester resin (A) represented by formula (I);
   an epoxy resin (B);
   an inorganic filler (C), and
   a maleimide compound (D);
   the content of the cyanate ester resin (A) being 30 to 70 parts by weight based on 100 parts by weight in total of the cyanate ester resin (A) and the epoxy resin (B),
   the content of the epoxy resin (B) being 30 to 70 parts by weight based on 100 parts by weight in total of the cyanate ester resin (A) and the epoxy resin (B),
   the content of the inorganic filler (C) being 562.5 to 700 parts by weight based on 100 parts by weight in total of the cyanate ester resin (A) and the epoxy resin (B),
   the content of the maleimide compound (D) being 10 to 70 parts by weight based on 100 parts by weight in total of the cyanate ester resin (A) and the maleimide compound (D),

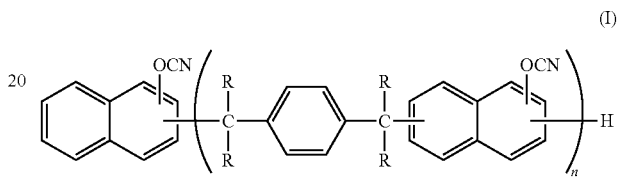

(I)

wherein each R independently represents a hydrogen atom; and n is an integer of 1 to 5, wherein the epoxy resin (B) comprises a biphenylaralkyl epoxy resin the inorganic filler (C) comprises aluminum oxide, and the maleimide compound (D) comprises bis(3-ethyl-5-methyl-4-maleimidephenyl) methane.

2. A prepreg comprising: a base material; and a resin composition according to claim 1 impregnated into or coated on the base material.

3. A laminated sheet comprising a cured product of the prepreg according to claim 2.

4. A metal foil-clad laminated sheet comprising a laminated and cured product of the prepreg according to claim 2 and a metal foil.

* * * * *